Sept. 10, 1946.    J. W. ANDERSON    2,407,215
WINDSHIELD WIPER SYSTEM
Filed Nov. 16, 1942
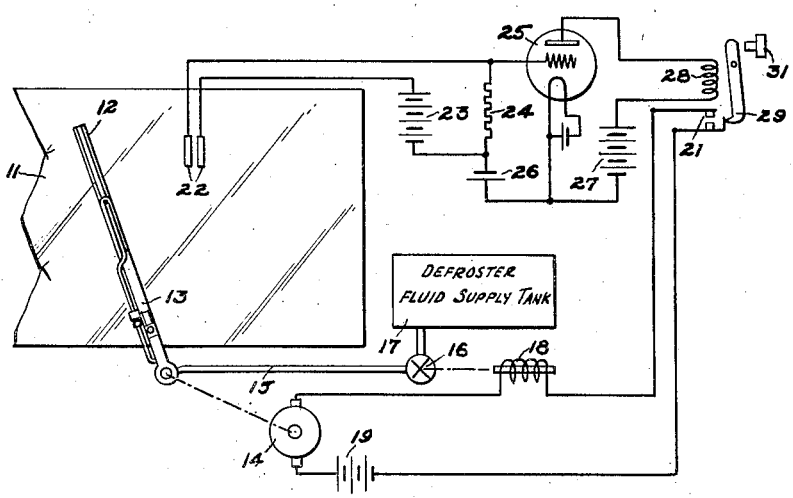
Inventor:
John W. Anderson
BY:
Alois W. Graf
Atty.

Patented Sept. 10, 1946

2,407,215

UNITED STATES PATENT OFFICE 2,407,215

WINDSHIELD WIPER SYSTEM

John W. Anderson, Gary, Ind., assignor to Productive Inventions, Inc., a corporation of Indiana Application November 16, 1942, Serial No. 465,649

3 Claims. (Cl. 15—250.4)

My invention relates to windshield wipers and more particularly to windshield wiper systems operating to clean, defrost or de-ice a windshield.

In automotive craft for land or water, it is necessary for the operator at all times when the craft is in motion to look through a windshield in order to guide the craft, and hence whenever the vision through the windshield becomes lessened or impaired by an accumulation thereon, the operator causes a windshield wiper cleaner or defroster to be actuated to clean the windshield to provide clear vision. In aircraft, however a special problem arises, since the greater portion of the flight may be performed by blind or instrument flying, and it may be only when the craft is in the vicinity of the objective that the pilot has occasion to look through the windshield. If at the time that the objective has been nearly reached, the windshield is obscured by a film or sheet of foreign matter such as frost or ice, it will be apparent that it may take considerable time for a windshield wiper to remove the frost or ice to provide clear vision. Since, during the flight, the pilot has to give his attention to other things, it is desirable to provide an apparatus which will detect the presence of any frost or ice on a windshield which tends to obscure the vision.

Since in aircraft the principal cause of impaired vision which cannot be speedily corrected is the accumulation of frost or ice on the windshield, it is advantageous to provide a windshield wiper of the defroster or de-icer type which preferably conducts the de-icing fluid alongside the windshield wiper blade so as to confine and direct the application of the fluid across the surface to be wiped thereby also conserving the de-icing fluid.

It is a primary purpose of the present invention to provide a windshield defrosting and de-icing system which includes means for detecting the presence of frost or ice on the windshield and which, in response thereto, will actuate the windshield wiper and control the delivery of de-icing fluid so as to clear the windshield and to prevent accumulation of any appreciable amount of frost or ice thereon. Such a system therefore would automatically provide clear vision at the time that the objective has been nearly reached by an aircraft. It furthermore will be appreciated that in climates such as, for example, the winter climate of the north temperate zone it may be highly desirable to provide such an apparatus for certain surface vehicles. For example, a delivery vehicle is apt to be parked from time to time and it is desirable that the windshield be kept free of frost and ice, so that clear vision will be immediately available to the vehicle operator as soon as he re-enters the vehicle and starts to drive.

It is not important that the wiper be operated nor that de-icing fluid be delivered for the mere purpose of removing moisture, in the absence of the operator or pilot, since moisture can be disposed of very quickly and without resort to the use of de-icing fluid whenever the need for moisture removal is observed. It is important, however, that the system be capable of operation in response to the accumulation of ice or frost.

In accordance with a practical and advantageous embodiment of the invention a control circuit is provided, comprising spaced electrodes, which is designed to provide grid bias in an amplifier circuit, the value of the bias being determined by the voltage drop between the electrodes. The amplifier output energizes a relay for closing an operating circuit, which circuit desirably includes the wiper operating motor and a solenoid for opening the fluid supply valve. The amplifier, and the relay controlled thereby, are desirably so constructed and arranged that the relay will be automatically effective to close the operating circuit only when a film of sufficient thickness has been developed between the electrodes to lower the electrical resistance between them substantially more than it would be lowered by rainfall.

Other and further objects of my invention will become more readily apparent by reference to the following description taken in connection with the accompanying drawing in which the single figure schematically illustrates the mechanical and electrical apparatus embodied in my invention.

Referring more particularly to the drawing, it will be seen that there is represented a portion of a windshield 11 for the pilot of an aircraft. A windshield wiper apparatus of the defrosting type is provided for the windshield 11, and this may include a wiper blade 12 attached to a wiper arm 13 which is arranged to be driven by a suitable wiper motor 14. The windshield wiper blade 12 and the wiper arm 13 are preferably of a type corresponding to that shown in a copending application of Theodore J. Smulski, Serial No. 401,951, filed July 11, 1941, for an improvement in Windshield wipers. In order to supply defrosting fluid to the wiper blade and arm, there is provided a fluid conduit 15 between the arm and a control valve 16 which in turn is connected to a suitable source of de-icing fluid 17. The control valve 16 is actuated by a solenoid 18 which is connected in an electrical circuit with the windshield wiper motor 14, a suitable source of electrical energy 19 and a pair of electric contacts 21. The solenoid 18 may be connected in parallel with the motor 14 or in series therewith as shown, so that both the solenoid and the motor are energized whenever the electric contacts 21 are closed.

In order to initiate the operation of the windshield wiper apparatus and defrosting system, there is provided on the windshield 11 a plurality of spaced apart conductive surfaces or electrodes 22. The electrodes 22 are connected in an electric circuit and are arranged to close the contacts 21 whenever the resistance between the electrodes falls below a predetermined value. As representative of any one of a number of types of electric circuits suitable for accomplishing the detection of ice or frost on a windshield and the initiation of the operation of a windshield wiper apparatus, there has been shown an electric circuit having one of the elements 22 connected to a suitable source of voltage 23 which in turn is connected through an impedance or a resistor 24 and a conductor to the other one of the conducting elements 22. Thus whenever ice accumulates on a windshield, the resistance between the spaced apart conductive members 22 will be changed progressively causing progressively more current to flow therethrough and through the resistor 24 and thereby causing a diminishing potential drop to appear across the electrodes and an increasing potential drop to appear across the resistor. The impedance 24 is connected in the control circuit of a suitable electrical valve or vacuum tube 25. The control circuit includes a suitable source 26 of biasing voltage arranged so that no appreciable anode current occurs until the voltage drop appearing across the impedance 24 has attained a predetermined value. The anode of the valve 25 is supplied with potential from a suitable source 27 and it includes the winding of a relay 28 arranged to actuate the lower contact of a pair of contacts 21. Whenever the relay is actuated, the lower contact is arranged so that a locking lever 29 locks the contacts 21 in closed circuit relation.

Since the electrically conductive elements 22 which are mounted so as to be flush with the outer surface of the windshield, are wiped clean by the blade 12, there is a possibility that the conductivity of the path appearing between these two elements will be reduced sufficiently so that the voltage appearing across the resistor 24 would drop so as to interrupt or reduce the anode current flow of the valve 25 sufficiently to deenergize the relay 28. Thus it will be seen that the lock-in 29 prevents any chattering of the contacts 21. After the windshield wiper apparatus has been in operation for a period of time the pilot, upon assuming that the windshield has been cleaned, then may stop the apparatus by pushing a button 31 which is arranged to disengage the locking lever 29 of the relay 28. If at the time that the latch 29 is disengaged from the contacts 21, the surface wiped by the windshield wiper blade 12 is not yet clean, or ice is still accumulating on the windshield, the relay 28 will hold or again pick up the contacts 21 thus causing the latch 29 to again lock the relay. If, however, at the time that the element 31 has been actuated manually, there is no accumulation on the windshield sufficient to cause the relay 28 to hold the contacts 21 together, the contacts 21 will be separated and will cause the electric motor 14 and the solenoid 18 to be deenergized and the valve 16 to be shut off in response to de-energization of the solenoid 18.

While for the purpose of describing and illustrating my invention I have shown a single embodiment, it is to be understood that I am not to be limited thereby since variations may be made in the circuit arrangement and in the instrumentalities employed without departing from the spirit and scope of my invention as set forth in the appended claims.

I claim:

1. In a windshield wiper apparatus, a pair of spaced electrodes mounted on the outer surface of said windshield, a source of potential and an impedance connected thereto, a normally non-conductive electric valve having a control circuit including said impedance, means for delivering de-icing fluid to the windshield, and control means therefor energized through said electric valve whenever the voltage drop appearing across said impedance exceeds a predetermined value characteristic of the accumulation of ice.

2. A windshield wiper system comprising a wiper motor, a wiper arm and blade therefor, a pair of spaced electrodes mounted on the surface of said windshield within the area wiped by said blade, a source of electric potential connected thereto, circuit means including a source of power for said wiper motor and a normally open control switch therefor, means including a relay responsive to a change in the conductivity of a path between said electrodes to close said control switch and thereby connect said source of power to said wiper motor, mechanical means for locking the switch closed, and manually operable means for unlocking the switch.

3. A windshield wiper system comprising a windshield provided with a wiper motor, a wiper arm and blade therefor, a source of defrosting fluid arranged to supply fluid to the surface of said windshield in the proximity of said wiper blade, valve means for controlling the supply of said fluid thereto, a source of power for said motor, a pair of electrodes mounted on the surface of said windshield within the area to be wiped by said wiper blade, a source of electric potential and an impedance connected to said pair of electrodes, an electric valve having a control circuit arranged to be responsive to a voltage appearing across said impedance, a lock-in relay connected to be energized by said electric valve, said relay being provided with a plurality of contacts and with means for manually restoring said relay to unlocked condition and means connected to said contacts for actuating said valve and for supplying power from said source to said wiper motor.

JOHN W. ANDERSON.